(12) United States Patent
Burton (10) Patent No.: US 8,527,098 B2
(45) Date of Patent: Sep. 3, 2013

(54) HEATING, VENTILATION, AND AIR CONDITIONING MANAGEMENT SYSTEM AND METHOD

(75) Inventor: Benjamin Trent Burton, Southwark (GB)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

(21) Appl. No.: 13/528,033

(22) Filed: Jun. 20, 2012

(65) Prior Publication Data

US 2013/0079932 A1   Mar. 28, 2013

Related U.S. Application Data

(63) Continuation of application No. 13/246,013, filed on Sep. 27, 2011, now Pat. No. 8,229,597.

(51) Int. Cl.
*G05D 23/19* (2006.01)

(52) U.S. Cl.
USPC .......................................... 700/276; 700/278

(58) Field of Classification Search
USPC ............... 700/275, 276, 278, 282, 299, 300; 236/1 E; 165/247
See application file for complete search history.

(56) References Cited

U.S. PATENT DOCUMENTS

| 6,205,798 | B1* | 3/2001 | Porter et al. ............... 62/129 |
| 6,658,373 | B2* | 12/2003 | Rossi et al. ............... 702/185 |
| 7,080,521 | B2* | 7/2006 | Ludwig et al. ............. 62/208 |
| 7,260,946 | B2* | 8/2007 | Ludwig et al. ............. 62/115 |
| 7,266,961 | B2* | 9/2007 | Ludwig et al. ............. 62/231 |
| 7,472,558 | B1* | 1/2009 | Narita ....................... 700/278 |
| 7,584,021 | B2* | 9/2009 | Bash et al. .................. 700/276 |
| 7,890,215 | B2* | 2/2011 | Duncan ..................... 700/276 |
| 8,185,246 | B2* | 5/2012 | Josserand et al. ........ 700/278 |
| 8,229,597 | B2* | 7/2012 | Burton ....................... 700/276 |
| 2006/0042278 | A1* | 3/2006 | Ludwig et al. ............. 62/130 |
| 2006/0042296 | A1* | 3/2006 | Ludwig et al. ............. 62/323.4 |
| 2006/0161306 | A1* | 7/2006 | Federspiel ................. 700/276 |
| 2006/0196211 | A1* | 9/2006 | Ludwig et al. ............. 62/323.4 |
| 2006/0259276 | A1* | 11/2006 | Rossi et al. ................ 702/182 |
| 2008/0315000 | A1* | 12/2008 | Gorthala et al. ........... 236/46 |
| 2009/0032235 | A1* | 2/2009 | Sullivan et al. ........... 165/247 |
| 2009/0171512 | A1* | 7/2009 | Duncan ..................... 700/300 |
| 2009/0173473 | A1* | 7/2009 | Day ........................... 165/67 |
| 2010/0100246 | A1* | 4/2010 | Josserand et al. ........ 700/282 |
| 2011/0137468 | A1* | 6/2011 | Duncan ..................... 700/277 |

OTHER PUBLICATIONS

International Search Report and Written Opinion issued Sep. 5, 2012 in corresponding Application PCT/US12/48483.

* cited by examiner

*Primary Examiner* — Charles Kasenge
(74) *Attorney, Agent, or Firm* — Goodwin Procter LLP (57) ABSTRACT

Systems and methods of controlling a heating, ventilating, and air conditioning system are provided that operate according to signals returned from return air temperature sensors as well as the supply air temperature sensors. Using predetermined temperature setpoints, return temperature information, and supply temperature information, the HVAC system is configured to maintain the temperature of a room first, by the use of its cooling valve, and second and only when the capacity of the cooling valve has peaked, by use of the fan. The presently disclosed improved HVAC system operates more efficiently by avoiding unit loading hopping and minimizing power consumption.

16 Claims, 5 Drawing Sheets

HEATING, VENTILATION, AND AIR CONDITIONING MANAGEMENT SYSTEM AND METHOD

CROSS-REFERENCE TO RELATED APPLICATION

This patent application is a continuation of U.S. patent application Ser. No. 13/246,013 filed on Sep. 27, 2011 now U.S. Pat. No. 8,229,597, entitled "Heating, Ventilation, And Air Conditioning Management System And Method", which is hereby incorporated by reference.

FIELD OF THE INVENTION

Embodiments of the present invention relate generally to field of heating, ventilation, and a conditioning (HVAC) systems. More specifically, the invention relates to energy efficient HVAC systems that are used in commercial spaces.

BACKGROUND OF THE INVENTION

Modern heating, ventilation, and air conditioning (HVAC) systems are used in a wide range of environments for various purposes and are relied upon in virtually every industry. These HVAC systems, for example, may be used in single-family homes, multilevel office buildings, or even complex automated computer data centers spanning acres. Modern HVAC systems can provide ventilation, reduce air infiltration, and maintain pressure relationships between spaces in these environments.

At the same time, the costs of operating these systems may be very high. For example, the maintenance and electricity costs for a large HVAC system, such as those used on computer data centers, may cost a company millions of dollars. A typical one-megawatt data center may consume as much as 16 million kilowatt-hours of electricity a year, or the equivalent to the energy consumed by 1400 average U.S. households. The total electric bill for computer servers and data centers has risen to over 100 billion kilowatt-hours of energy annually, costing roughly 7 billion dollars in the US alone. By 2010, world data center electricity use represented between 1.1 and 1.5 percent of world electricity use, while in the U.S., data center electricity use represented between 1.7 and 2.2 percent of the total. At the same time, these servers and data centers contribute to more 0.5 percent of the total U.S. greenhouse gas emissions, which is expected to double by 2020.

These high costs can largely be attributed to these large systems' inefficiencies. Remarkably, while modern HVAC systems may differ in size and power, the systems that are used in high-tech computer data rooms operate largely in the same manner as those used in family homes. Even more extraordinary, the HVAC units that comprise a large HVAC system do not operate together as one would expect of a modern electronic system. These individual units are not controlled by a central controller or computer such that they would work together to maintain the air of the entire environment Instead, each operates independently to maintain the air of its individual space, often competing against each other in managing the temperature, humidity, and pressure in the room. For example, in a modern data room HVAC system, each HVAC unit controls its fans and its cooling valves in response to only its own return airflow temperature sensor readings and does not communicate with the other units or otherwise work with the other units to maintain the temperature of the room.

This manner of operation results in tremendous inefficiency. The limited use of sensors compounded by the lack of direct communications with other HVAC units leads to uneven operations between the units, a situation called "load hopping." For instance, one unit may be running at full capacity while a neighboring unit runs at low capacity or sits completely idle. Moreover, it leads to constant activations, deactivations and adjustments by each HVAC unit as they each attempt, and often compete, to cool the room to the desired temperature. The units often overshoot the targeted temperature, causing other units to adjust incorrectly in response, resulting in a situation in which there is an infinite loop of readjustments by the units, with the units never hitting their targeted temperature. This causes uneven floor temperature distribution and localized supply air heating. Such a method results in tremendously inefficient power-consumption rate and a greater rate of HVAC unit component failures.

Accordingly, there is an important need for an improved method and system for controlling HVAC to operate more efficiently, particularly by avoiding load hopping and minimizing power consumption. A more efficient method and system for controlling HVAC systems may save corporations, and U.S. households alike, millions of dollars in total power costs each year and reduce greenhouse gas emissions.

SUMMARY OF THE INVENTION

The presently disclosed invention satisfies the above-described needs by introducing systems and methods of controlling a heating, ventilating, and air conditioning system that operates according to signals returned from its return air temperature sensors as well as the supply air temperature sensors. By using both of these signals to control the fan speed and the cooling valve openings and by prioritizing the use of the cooling valves over the use of the fans in order to reduce the temperature of a room, these units, though independent from one another, act together to efficiently maintain the temperature and air quality of the entire environment. In addition, by controlling the cooling valves based, partly, on the supply air temperature, load hopping may be avoided.

In one aspect, embodiments of the present invention provide a method for configuring a heating, ventilation, and air conditioning system, the system including at least one HVAC unit, with each unit including a control circuit, and the method including the steps of receiving a return air temperature signal at the control circuit at the at least one HVAC unit; receiving a supply air temperature signal at the control circuit of the at least one HVAC unit; and controlling a fan and a cooling value of the at least one HVAC unit based on the received return air temperature signal and the received supply air temperature signal.

In one embodiment, the method further comprises the step of generating a cooling valve drive signal according to at least one of return air temperature signal and supply air temperature signal. In this embodiment, the cooling valve may be controlled to increase the at least one cooling valve's water output based on the higher of a cooling valve drive signal between the return air temperature signal and the supply air temperature signal. In another embodiment, the return air temperature is compared with the supply air temperature signal and the cooling valve is controlled based on this comparison. At the same time, the fan may operate at a minimum speed based on the operations of the cooling valve, including its current operating capacity. In certain instances, the fan may then be controlled to operate at a speed above the minimum speed. Specifically, this may occur when the cooling valve is operating at a maximum capacity.

In another aspect, a heating, ventilation, and air conditioning system is provided, the system having at least HVAC unit, with each HVAC unit including: a fan, a cooling valve, and a processor that is coupled to least one fan and at least one cooling valve. The processor is adapted to execute instructions to receive a return air temperature signal at the control circuit at the at least one HVAC unit; receive a supply air temperature signal at the control circuit of the at least one HVAC unit; and control the fan and the cooling valve of the at least one HVAC unit based on the received return air temperature signal and the received supply air temperature signal.

In one embodiment, the system is further adapted to execute instructions to generate a cooling valve drive signal according to at least one of return air temperature signal and supply air temperature signal. The cooling valve may then be controlled to increase its water output based on the higher of the cooling valve drive signal between the return air temperature signal and the supply air temperature signal.

In another embodiment, the return air temperature signal is compared with the supply air temperature signal. The cooling valve is then controlled based on the results of this comparison. At the same time, the fan may operate at a minimum speed based on the operations of the cooling valve, including its current operating capacity. In certain instances, the fan may then be controlled to operate at a speed above the minimum speed, such as when the cooling valve is operating at a maximum capacity.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide systems and methods for a heating, ventilation, and air conditioning (HVAC) system. Specifically, to efficiently maintain the temperature and air quality of an environment, the plurality of HVAC units of the system operates according to signals returned from each unit's return and supply air temperature sensors.

Figure 1:
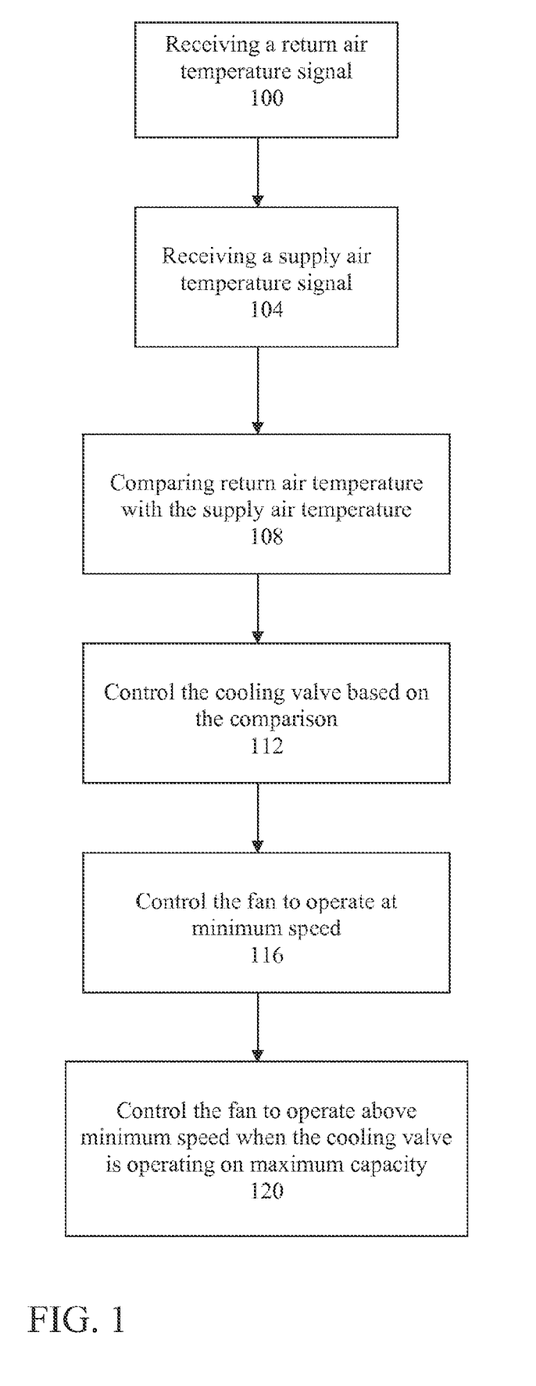
FIG. 1 is a flow chart illustrating an exemplary method of configuring and operating an efficient HVAC system.

A method for configuring a heating, ventilation, and air conditioning system is provided in FIG. 1. The HVAC systems of the presently disclosed invention is configured to maintain the temperature of a room, first, by use of the cooling valves, and second and only when the capacity of the cooling valve has peaked, by use of the fans. At step 100, the HVAC units in the HVAC system are configured to receive a return air temperature signal. This signal provides the temperature of air entering each HVAC units. This temperature is likely to be the ambient temperature of the room or the air near each unit. Similarly, a supply air temperature signal is received. This provides the temperature of the air exiting the HVAC unit, after it has been processed by the HVAC unit. In most embodiments, the return air temperature will be higher than that of the supply air temperature. The temperature information from the sensors may be stored and may be used at a later time for analysis. The HVAC units may be configured in certain embodiments to control the fans and cooling valves partly based on the historical temperature values received at each HVAC unit.

In certain embodiments, a user's inputs may also be received, including various setpoint temperatures, which may be used to control the operations of each HVAC unit in operation. For example, the supply air setpoint temperatures and return air supply setpoint temperatures may be inputted by users of the units and may be stored at each unit. In the preferred embodiment, each unit's supply air temperature will be set to the temperature the user wishes to operate the room and the return air setpoint will be set at some degrees above the actual return temperature of the specific HVAC unit, such as one degrees. Other information may be inputted and stored, including the fan minimum setpoint percentage, the fan ramping rate and the cooling valve ramping rate. The fan minimum setpoint percentage is the minimum speed in which the fan may operate, as determined by a user. This value may be the optimal energy efficient value that the fan of each HVAC unit may operate. For example, in certain embodiments, this value may be 70 percent of the maximum capacity of the fan. The fan ramping rate and the cooling valve-opening rate values determine the rate in which the fans' speed will be increased and the rate in which the cooling valve will be opened when the HVAC units are operating to cool the return air's temperature. For example, the fan ramping rate may determine how much faster the fan speed will increase per minute while the room's temperature is higher than desired. Similarly, the cooling valve-opening rate may determine the rate at which the valve will further open per minute while the room's temperature is higher than desired.

At step 108, the return air temperature is compared with that of the supply air temperature. In one preferred embodiment, the return air temperature is first compared with a predetermined return air setpoint temperature, configurable by a user of the system. When the return air temperature exceeds that of this return air setpoint temperature, a cooling valve drive signal is generated. Similarly, the supply air temperature is compared with a predetermined supply air setpoint temperature, also configurable by a user of the system. When the supply air temperature is higher the supply air setpoint temperature, then a cooling valve drive signal is also generated. The generated drive signals are then compared. The higher of the drive signals, which is the signal that requires the cooling valve to open to the greater capacity, is then used to operate the cooling valve accordingly. In one embodiment, the larger of the differential between the actual temperature and the setpoint temperature may be used to generate a cooling valve drive signal and to control the cooling valve. In another embodiment, a drive signal is generated whenever the return air temperature is not equal to that of the return air setpoint temperature and, likewise, when the supply air temperature is not equal to that of the supply air setpoint temperature. Other methods of comparisons of the return air and supply air temperature are well within the scope of the presently disclosed invention. In certain embodiments, the drive signals from the return air supply may have a higher priority in controlling the cooling valve, or vice versa. In such cases, the drive signal generated from the supply air comparisons may need to be greater by a certain percentage or amount before it may be used to control the cooling valve. The results of the comparisons, in turn, cause the cooling valve to operate according to a predetermined manner.

At step 116, while the cooling valve is controlled according to the received temperature sensor signals, the fan of the HVAC unit is controlled to operate at a minimum speed, such as that speed set by the fan minimum setpoint percentage. In certain embodiments, this entails operating the fan at the most power-efficient speed. Thus, the fan may be controlled to operate at, for example, 70 percent of its maximum capacity. In other embodiments, this entails operating minimally, such as 10 percent of the fan's capacity.

Thus, the cooling valve is used to maintain the temperature of a room with varying conditions, all the while maintaining the fan speed at a minimum in order to save power. By only changing the cooling valve in response to the room's conditions and keeping the fan speed constant, load hopping may be avoided, as the unit does not attempt to cool the room by constantly adjusting two independent variables.

In certain instances, the controlling of the cooling valves alone will not be sufficient to lower the temperature of a room. In many instances in which the room's temperature is too high, the complete opening of the cooling valve to 100 percent capacity will be insufficient to lower the temperature of the room. In these instances, the HVAC units are configured to control the fans in response. At step 120, recognizing that that the cooling valve has been operating at maximum capacity for a predetermined amount of time, the fan's speed will be increased above its predetermined minimum. The fan speed will then begin to increase until the cooling valve is no longer operating at 100 percent. In certain embodiments, the optimal speed to cool the temperature of the room will be determined and the fan will operate at that above-minimum speed for a predetermined amount of time before the fan speed is recalculated again. In most cases, the fan speed will operate above the minimum speed until the return and supply air temperature signals no longer cause the cooling valve to operate at 100 percent capacity. When the cooling valve begins to operate below full capacity, the fan may be automatically controlled to resume operating at the minimum speed, such as 70 percent. In another embodiment, the fan will reduce its speed slowly at a predetermined rate until it reaches its minimum speed. This may ensure an overshooting of cooling reduction, which would cause the temperature of the room to increase above the setpoints again.

Embodiments of the presently disclosed invention may be used in commercial or large residential environments, or any other large areas of space requiring multiple HVAC units and/or strict temperature maintenance. In one particular preferred embodiment, the presently disclosed invention is used in a computer room to maintain the air temperature of the computer systems contained therein.

Figure 2:
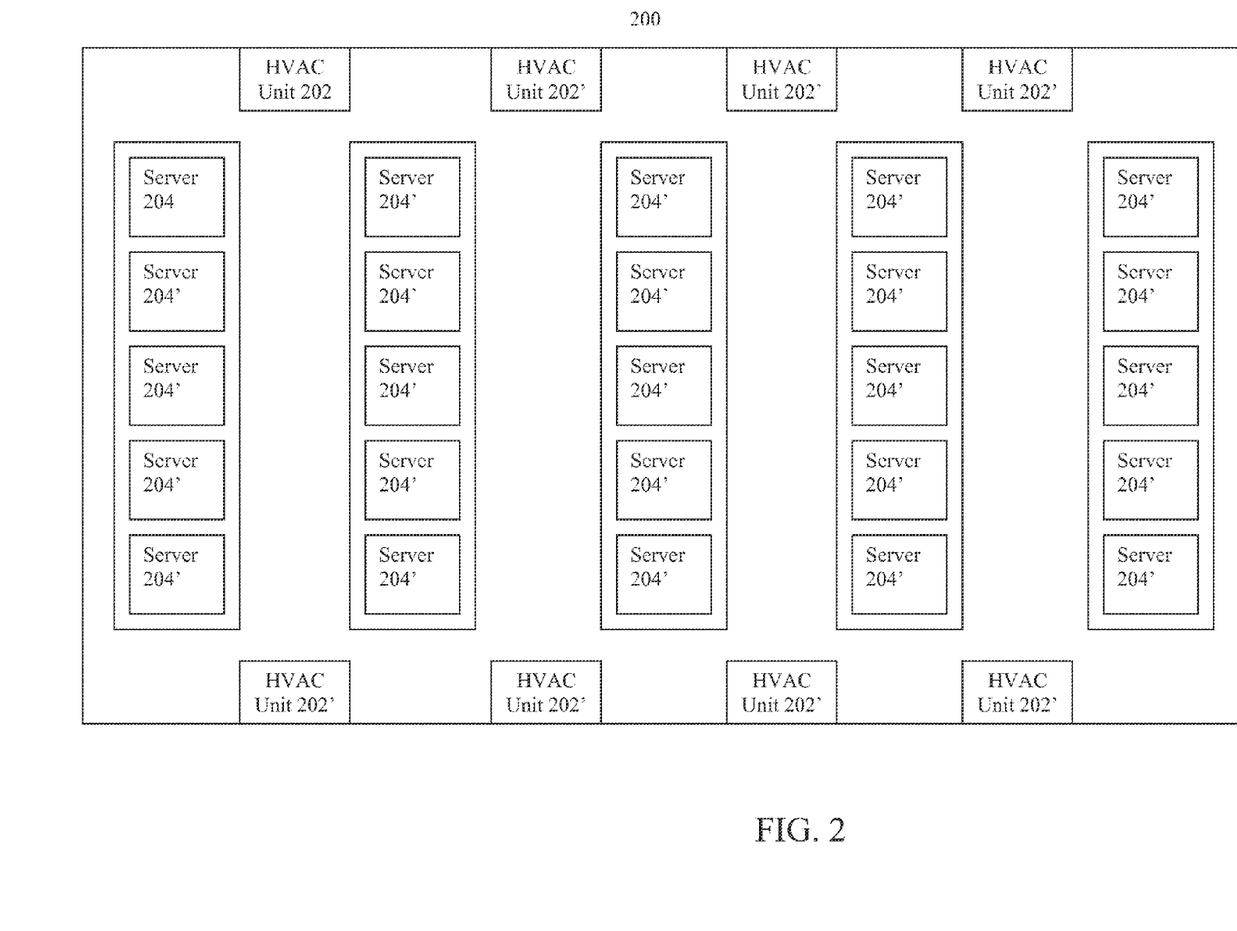
FIG. 2 illustrates a floor plan of a data room utilizing the presently disclosed HVAC system.

A floor plan of a data center 200 containing such a system is depicted in FIG. 2. Such a system, known in the industry as a Computer Room Air Conditioning (CRAC) System, may be used in data centers that span across hundreds of acres of land and, yet, require the temperature to be maintained for each individual server. In the depicted exemplary data center 200, there is a plurality of HVAC units 202, 202' spaced evenly throughout the floor. In this configuration, the units are positioned based on the placement of the servers on the floor. As depicted in FIG. 2, there may be a plurality of servers 204, 204' stored in rows of server racks and a plurality of HVAC units that are placed along the walls of the room. Thus, there may be a plurality of HVAC units, each responsible for one or more servers 204, 204'. Each HVAC unit 202, 202', is responsible for maintaining the temperature of the area physically located near it by cooling, heating, humidifying, or dehumidifying the air. It is advantageous and desirable to have more than one HVAC unit responsible for each area on the server floor for redundancy purposes. This ensures that temperatures of each area may be maintained even when one HVAC unit fails to operate or malfunctions, thereby ensuring, a least temporarily, the avoidance of server failures.

In certain embodiments of the CRAC system, servers 204, 204' are positioned on a floor that has been raised, providing space for air to be ventilated underneath the floor. Each CRAC unit receives the higher-temperature air above the floor, processes and cools the air through cooling means and procedure described in more details below with respect to each unit, and releases the cooler air underneath the raised floor. The cooler air travels throughout the space underneath the raised floor and is released through vents or other ventilation means well known in the art through the floors including directly underneath the server racks. Thus, this creates an airflow system wherein hot air produced at servers and server racks are cooled as necessary.

In embodiments of the presently disclosed invention, the individual HVAC units 202, 202' are not controlled by a central controller or computer. Instead, each unit operates independently to maintain the air near each unit. This manner of operation is common for HVAC systems that are used in commercial and residential spaces and is especially common for CRAC systems. Each unit may be individually programmed or controlled by a computer that is connected to or is part of each HVAC unit.

Figure 3:
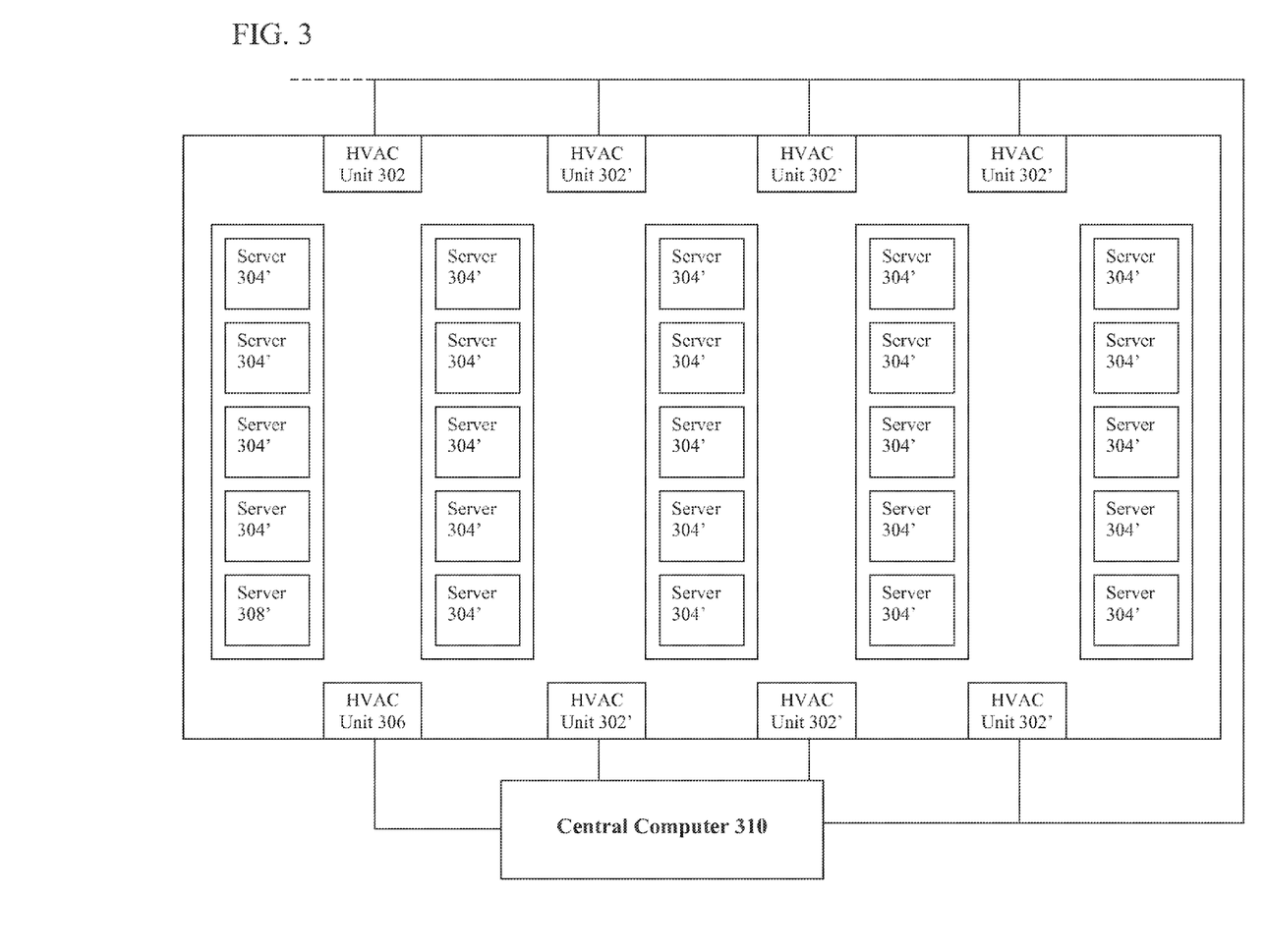
FIG. 3 illustrates a floor plan of a data room utilizing the presently disclosed HVAC system that further contains a central computer.

In another embodiment, the individual CRAC units may be connected to a central computer, which may then be controlled by the central computer. As shown in FIG. 3, the individual HVAC units 302, 302', and 306 of the systems may be connected to a central computer 310. This central computer 310 may have the capability to program each of the HVAC units 302, 302', and 306 to act in any manner as desired. The central computer may control the fan speed or the cooling valve opening of each unit, according to the signals received from each unit's return air temperature sensor and the supply air temperature. Thus, in such a system, the return and supply setpoint temperature may be controlled by the central computer 316. In other embodiments of the presently disclosed invention, the central computer may be configured to set and automatically change setpoint temperatures of certain HVAC units based on processing load of a server 304. Thus, for example, when a server 308 of the system is processing a large number of requests or tasks such that the server 308's processor began to operate at a higher frequency and the overall temperature of the server 308 and the surrounding area began to increase, the central computer 310 may automatically control the HVAC units' cooling valves and/or fans. In these embodiments, the server 304, 304' and 308 may be connected to the central computer 310 (connection not shown). When the processing load of a server begins to increase or reaches a certain predetermined level, the central computer 310 may receive a signal from server 308 or detect the high load of the server 112 automatically. In response, the central computer 310, may anticipate any change in temperature of the area surrounding server 308 and may cause the CRAC unit 306, which is a unit known to be near server 308, to began to cool the area, such as by changing the setpoint temperature of the HVAC unit 306 such that the cooling valves are opened further and the temperature of the air supplied from the HVAC unit is lowered.

The depicted data centers 200 and 300 represent an exemplary illustration and a plurality of other components may be added or existing components may be removed or modified without departing from the scope of the invention. The data centers 200 and 300 may include any number of racks and various other apparatuses known to be housed in data centers. Thus, although the data centers 200 and 300 are illustrated as containing five rows of servers, it should be understood that the data centers 200 and 300 might include any number of servers and server racks without departing from the scope of the invention. The depicted configurations of the servers in data centers 200 and 300 are thus for illustrative purposes only and are not intended to limit the invention in any respect. In addition, the data center 200 and 300 may include any number of HVAC units 204, 204', 302, 302' and 306, each having a number of different types of cooling systems, such as those described in detail below.

Figure 4:
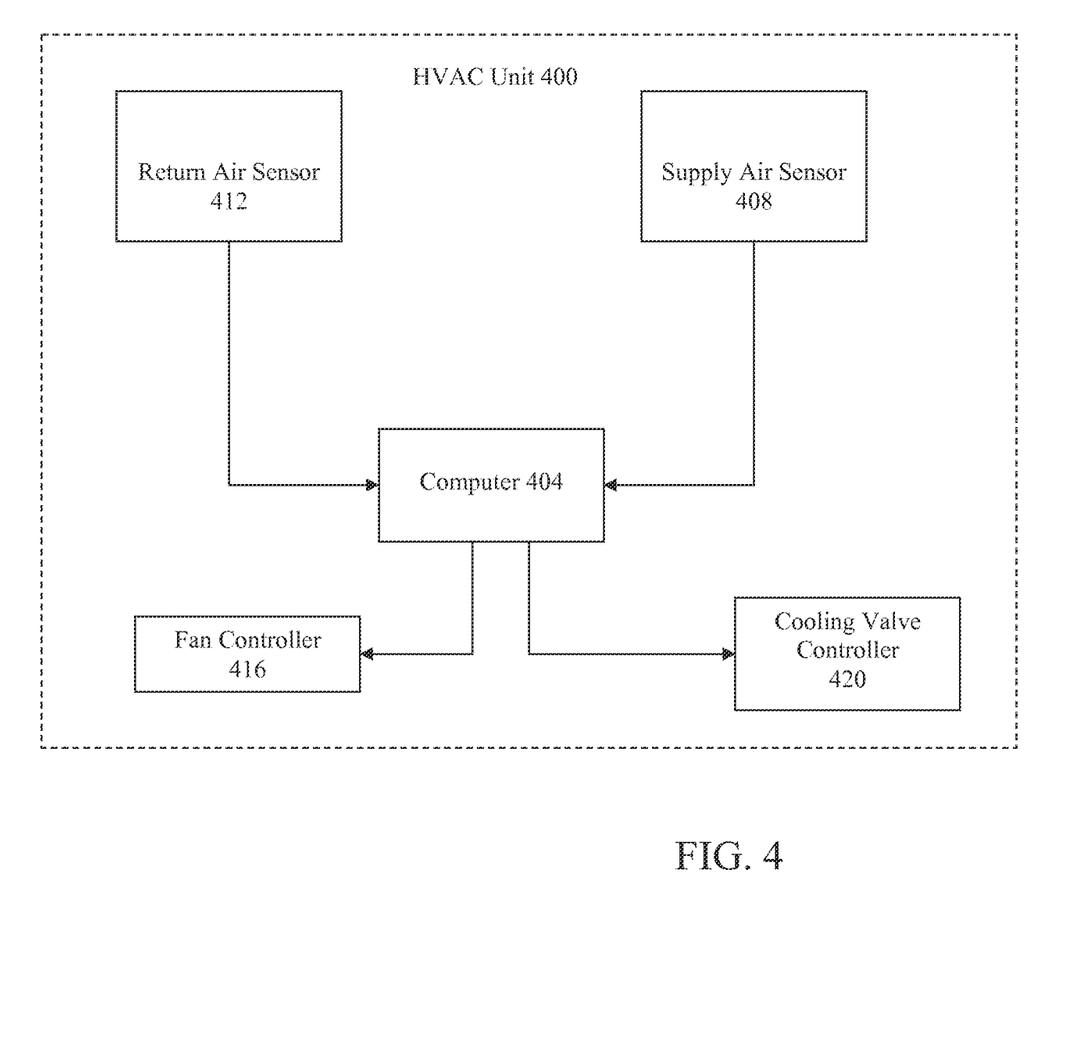
FIG. 4 illustrates a block diagram of one exemplary HVAC unit of the presently disclosed invention.

A block diagram of an exemplary HVAC unit is depicted in FIG. 4. The unit 400, which may contain a plurality of other components not shown, may comprise at least one return air sensor 412, at least one supply air sensor 408, a computer 404, a fan controller 416 and a cooling valve controller 420.

Each HVAC unit may contain or may be connected to a plurality of sensors. Specifically, each HVAC unit may contain or may be connected to one or more return air temperature sensors 412 and one or more supply air temperature sensors 408. Each sensor has the capability to send an electronic signal back to the computer 404 with the current temperature. The transmission of signals may occur automatically on a predetermined schedule, such as every 10 to 15 seconds, or it may occur upon requests. In certain other embodiments, the sensors may further have the ability to store a history of received sensor data. The temperature sensors 408, 412 may be physically located on or immediately near each HVAC units. In another embodiment, they may be located remotely from each HVAC unit and may communicate the information to each respective HVAC unit via wired or wireless communication means, including, but not limited to radio, Wi-Fi, cellular, Bluetooth, and other means well known in the art. The sensors may also be located on or near the various servers such as between the server racks.

The supply air sensor 408 may be positioned at an outlet of the unit and is thus configured to measure one or more conditions of the cooling fluid supplied by the unit. Alternatively, the sensors 408, 412 may be positioned at an inlet of a server or a server rack or near a floor vent, provided that servers, racks or the vent tile is located within a proximity to the exhaust of HVAC unit. The supply air temperature sensor may be positioned at a location substantially downstream of the unit where the temperature of the cooling fluid supplied by the unit does not vary beyond a certain level from the time the cooling fluid exits the unit. The return air temperature sensor, similarly, may be placed at the inlet of the HVAC unit, such as where the air is received at or within the unit prior to the air's processing/cooling by the HVAC unit. In another embodiment, the return air temperature sensor 412 is placed at a location remote from the HVAC unit, such as at a position within the room's airflow just prior to its receipt by the HVAC unit. The ideal location for such sensors may differ based on configuration of the computer room. One of ordinary skill in the art may determine the ideal location based on the room's configuration such that the temperature of the servers may be adequately measured, including adequately measuring or determining the existence of pockets of air that is of higher temperature than its surroundings. Overlapping sets of sensors may be used to control respective HVAC units to account for the coupling effects of multiple HVAC units on a common controlled space. Embodiments can also ensure that the spatial variation of the controlled environmental variables is minimized, thereby increasing efficiency and providing a comfortable and uniform temperature in the environment. In addition to these sensors, there may be a plurality of other types of sensors including sensors that measure the humidity, pressure, and other environmental conditions.

Information from the various sensors is received at a computer 404 located at each HVAC unit. The computer 404 may comprise a computer system, a controller, microprocessor, etc., configured to control operations of the HVAC units. More particularly, the computer 404 may be configured to receive input from the return air temperature and/or the supply air temperature sensors and to vary the operations of the various variable controllable systems contained in the HVAC units. The computer 404 may also be configured to receive inputs from a user of the system such as data center personnel, an administrator, a manager, or others. The input received from a user may comprise various setpoints by which the computer 404 may determine how and when to manipulate the operations of the variable control system. The computer 404 may, for example, compare the temperature, humidity, pressure, and other information detected by the sensors with predetermined setpoints for those conditions and control the variable control system in response to differences between the setpoints and the detected conditions. Thus, in the preferred embodiments, the system may store, temporarily or permanently, supply air temperature setpoints and return air supply temperature setpoints. Other information that the system may store includes fan minimum setpoint percentage, the fan ramping rate and the cooling valve span ramp rate.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions.

That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computer receives the data from the sensors 408, 412 and various other sources. Based on this information and the logic or computer program instructions stored at the computer, it controls a plurality of devices including at least one fan and at least one cooling valve. As seen in FIG. 4, the computer 404 is connected to a fan controller 416 and a cooling valve controller 420 via a data bus. By transmitting signals to the fan controller fan controller 416 and cooling valve controller 420, the computer controls the speed and output of the fans and cooling valves. The connection may also allow the computer to receive various parameter data from the fans and/or cooling valves such as the conditions of the fan and any filters. The computer 404 may additionally receive various alarm signals from the fan controller 416 and the cooling valve controller 420 including any water leak alarm, critical alarm, controller alarms, and general alarms.

The fan controller 416 may contain or may be connected to a variable speed drive (VSD) that operates to control the fan to vary the volume of cooling flow that is flowing into and out of the HVAC unit 400. The VSD, which may also be known as a variable-frequency drive (VFD), adjustable-frequency drive (AFD), AC drive, microdrives, and inverter drives, is widely used in ventilation systems and may comprise any reasonably suitable VSD that is commercially available from any number of manufacturers. The VSD generally operates to control the speed of an alternating current (AC) induction motor by converting power from fixed voltages/fixed frequencies to variable voltages/variable frequencies. By controlling the voltage/frequency levels of the fan, the flow rate of the cooling fluid supplied by each HVAC unit may also be varied accordingly. Thus in the disclosed systems, the computer 404 has the capability to control the voltage frequency level variably according to the instructions stored at the computer 404.

The cooling valve controller 420 may be connected to one or more valves that may be variably opened or closed to a controllable percentage. The cooling valve is a fluid bypass that allows a small amount of fluid to continuously enter the valve inlet, pass through the chamber of the valve, then out of the valve.

In operation, heated air enters into the HVAC unit 400 from the data center. It bypasses a filter and is cooled by the lower-temperature water entering the HVAC unit, as controlled by the cooling valve. The temperature of the water entering the units may be controlled and may be set at some predetermined level, such as 21 degrees Celsius. To control the temperature of the air exiting the HVAC unit, the cooling valve may be opened wider or narrower as necessary, which then results in more or less cool water flowing through the HVAC unit, thereby cooling the air to a controllable temperature. The fan may then be controlled to determine how much air is passed through the HVAC units.

In one embodiment, the hot air is cooled by operation of a cooling coil, a compressor, a condenser, and an expansion valve, which may operate under a vapor-compression cycle. A refrigerant may be contained in a refrigerant line and may be supplied into the cooling coil, resulting in the absorption of heat of the received hot air through convection. The cooled cooling air then flows out of the HVAC unit.

In some environments, heat may be necessary to maintain the temperature of a data room at an optimal level. In these cases, heated refrigerant is used and is flowed into the compressor, which is then flowed into the condenser where some of the heat in the refrigerant is dissipated into the air around the data center. The condenser may also include a fan to dissipate and spread the heat in a manner similar to that of the cooling systems. The refrigerant then flows through the expansion valve and back through the cooling coil. This process may be continuously repeated to cool the cooling fluid drawn into the HVAC unit.

In order to optimally maintain the temperature of a data center or other large environments requiring multiple HVAC units, the presently disclosed HVAC system contains executable program instructions that, when executed, operate to control the fan speed and cooling valves based on the information received from both the return air temperature and the supply air temperature sensors.

In particular, each unit will be controlled based on the information received from the return air temperature sensor and the supply air temperature as well as the information stored at the computer 404, including the supply air setpoint, the return air setpoint, the fan minimum setpoint percentage, the fan ramping rate, and the cooling valve ramping rate. The supply air setpoint and the return air setpoint are user customizable temperature values that, when compared with the corresponding return air temperature and the supply air temperature, determine the control signals transmitted by the computer 404. The fan minimum setpoint percentage, which is also customizable by the user, is the minimum speed in which the fan will operate. This value may be the optimal energy efficient values that each HVAC unit may operate. For example, in one embodiment, this value may be 70 percent. In other words, the fan of these HVAC units will operate, at a minimum at 70 percent of its maximum output. Finally, the fan ramping rate and the cooling valve-opening rate determine the rate in which the fans will increase their speed and valve openings in the HVAC unit's attempt to lower or increase the temperature of a room. For example, fan ramping rate may determine how much faster the fan speed will increase for every 3 minutes in which the room's temperature is higher than desired. Similarly, the cooling valve-opening rate may determine the percentage in which the valve opening will open further for every 5 minutes in which the room's temperature is higher than desired. While a certain time parameter is used in these examples, they are for exemplary purposes only and may be customizable by the users. Furthermore, the computer may only increase (or decrease) fan speed and valve opening under certain circumstances, as explained in detail below.

In the preferred embodiment, each unit's supply air temperature will be set to the temperature the user wishes to operate the data room. Thus, when the supply air temperature is higher than the desired supply air setpoint, the computer 404 will transmit a drive signal to the cooling valve controller 400 to open the cooling valve at the cooling valve-opening rate until the supply air temperature meets that of the supply air setpoint temperature. In one embodiment, this will be set at 18 degrees Celsius.

The return air setpoint may be set to one Celsius degree above the actual return temperature of the specific HVAC unit. Further, the fan minimum setpoint percentage will be set at 70 percent. Thus, in operation, the presently disclosed HVAC unit's computer 404 will transmit control signals to the fan controller 416 to operate the fan at 70 percent. In other embodiments, the fan minimum setpoint percentage will bet set higher or lower than 70 percent, depending on the fan's most power efficient rate of operation.

In order to save energy and to operate efficiently, each HVAC unit of the presently disclosed invention is configured to maintain the temperature of a room, first, by use of the cooling valve, and second and only when the capacity of the cooling valve has peaked, by use of the fan. In other words, each computer 404 is configured to maintain the fan speed at the fan minimum setpoint percentage until the cooling valve is operating at maximum capacity.

Figure 5:
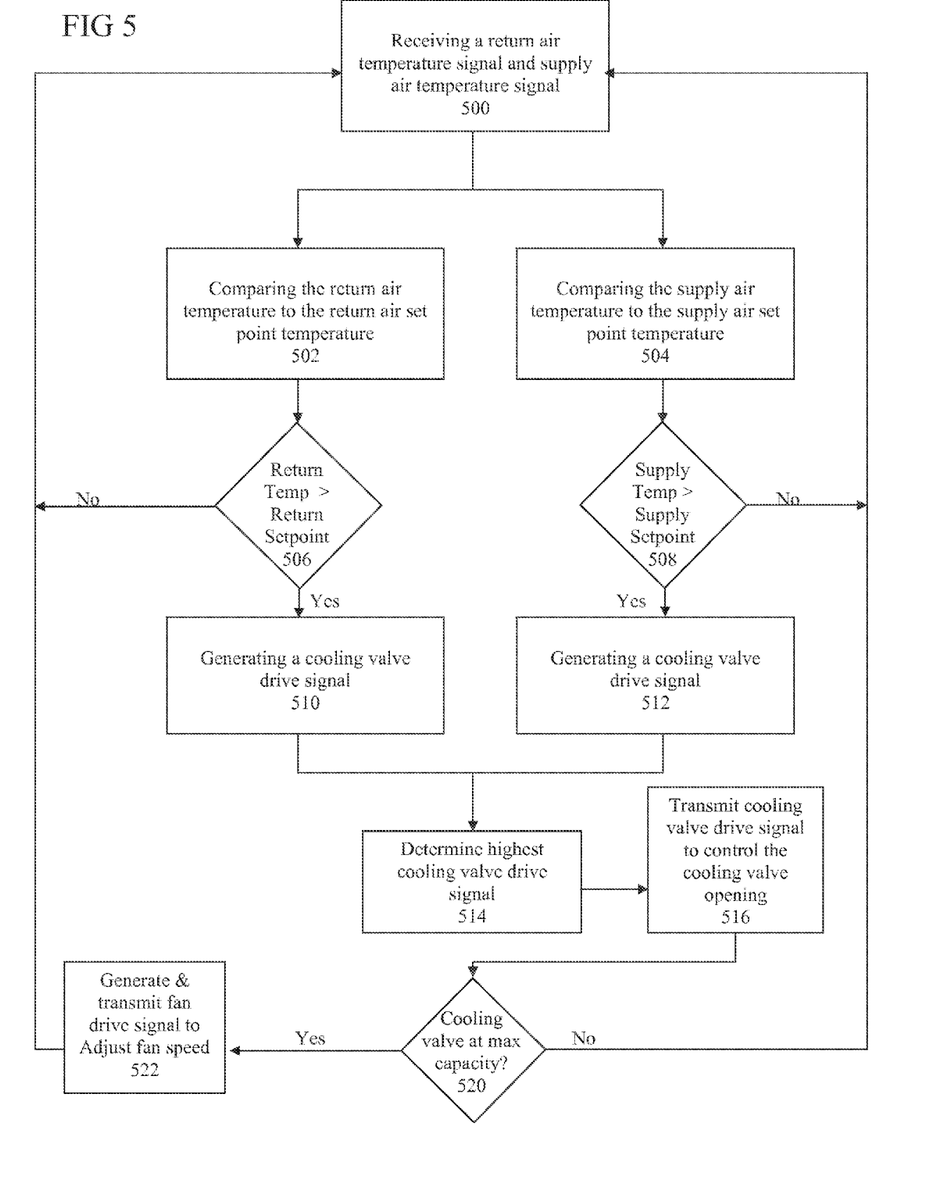
FIG. 5 is a flow chart illustrating an exemplary method for operating an HVAC unit.

FIG. 5 illustrates this method of maintaining the temperature of the room in more detail. In particular, the computer 404 will receive the return air temperature signal and the supply air temperature signal from the return air sensor 412 and the supply air sensor 408, as seen in step 500. In one embodiment, this receiving of the temperature signals is continuous and in-real time. In another embodiment, the computer 404 will receive the temperature signals at predetermined intervals or may receive the temperature on demand. The return air temperature and the return air setpoint temperature is compared at each instance in which the return air temperature signal is received, as shown in step 502 and 506. Similarly, at step 504 and 508, the supply air temperature is compared with the supply air setpoint temperature at each instance in which the supply air temperature signal is received by computer 404.

When the return air temperature exceeds that of the return air setpoint temperature, the computer 404 generates a cooling valve drive signal that operates at the cooling valve to open to a specific percentage or value, as seen at step 510. Similarly, when the supply air temperature exceeds that of the supply air setpoint, the computer, at step 512, calculates and generates a cooling drive signal that also operates at the cooling valve to open to a specific percentage or value. In another embodiment, a drive signal is generated whenever the return air temperature is not equal to that of the return air setpoint temperature and, likewise, when the supply air temperature is not equal to that of the supply air setpoint temperature. Other methods of comparisons of the return air and supply air temperature are well within the scope of the presently disclosed invention. In certain embodiments, the drive signals from the return air supply may have a higher priority in controlling the cooling valve, or vice versa. In such cases, the drive signal generated from the supply air comparisons may need to be greater by a certain percentage or amount before it may be used to control the cooling valve.

In the presently disclosed invention, which uniquely takes into consideration both the return air temperature and the supply air temperature, the computer 404 is further configured, in its control of the cooling vale control 420 and therefore the cooling valve, to compare the two cooling valve drive signals at step 514. It will then determine the higher of the two drive signals and, as shown at step 516, transmit a control signal to the cooling valve controller 420 to operate the cooling valve according to the higher drive signal. Any methods well known in the art may be used to determine the higher of the two signals. For example, the higher signal may be the signal that requires the cooling valve to open at the greater percentage. In one embodiment, the larger of the differential between the actual temperature and the setpoint temperature may be used to control the cooling valve. In certain embodiments, the comparison of the drive signals generated at the computer 404 in response to 1) the return air temperature and setpoint, and 2) the supply air temperature and setpoint, takes place at the cooling valve controller 420. In either case, the cooling valve is opened at a certain rate based on the received drive signal. In one embodiment, the computer is configured to further determine whether the cooling valve is already operating at maximum capacity, as seen in step 520. If it is not, the computer 404 is configured to restart the process. Similarly, when the return air temperature is less than or equal to the return air temperature setpoint or when the supply air temperature is less than or equal to the supply air temperature setpoint, the computer 404 is configured to restart the process of receiving the return and supply air temperature at step 500. In certain embodiments, the method does not begin for a predetermined period of time, such as 1 minute.

Thus, the presently disclosed HVAC units will continue to control the cooling valves by increasing or decreasing the cooling valve's opening as necessary to maintain the temperature of the room according to the setpoints. However, in certain instances, the controlling of the cooling valves alone, will not be sufficient to lower the temperature of a room. In particular, in many instances in which the heat created by the servers is too great, the cooling valve will be opened to 100 percent capacity without any effects in lowering the temperature of the room. Thus, as seen at step 520 of FIG. 5, the computer 404 will detect that the cooling valve is operating a maximum capacity. In these instances in which the cooling valve is operating at full capacity, the computer 404 is configured to, then, increase the speed of the fan from the minimum setpoint percentage. The computer 404, recognizing that that the cooling valve has been operating at maximum capacity for a predetermined amount of time, at step 522, generates and transmits a fan control signal that operates at the fan speed controller to increase the speed of the fans according to the predetermined fan ramping rate. The fan speed will then begin to increase according to the fan ramping rate, in one embodiment, the computer 404 will determine optimal speed to operate the fan in order to cool the temperature of the air in a predetermined amount of time. The fan may operate at that speed for a predetermined amount of time before recalculating the necessary optimal speed to operate. In most cases, the fan will operate above the minimum setpoint percentage until neither of the cooling valve drive signals that are generated at the computer 404 are operating the cooling valve at 100 percent capacity. When the cooling valve begins to operate below full capacity, the computer may automatically transmit a signal to the fan speed controller 416 to resume operating at the minimum setpoint percentage, such as 70 percent (step not shown). In another embodiment, when the computer 404 will simply reduce the fan's speed, but nonetheless, maintain the speed above the minimum setpoint percentage for a predetermined amount of time. This may ensure an overshooting of cooling reduction, which would cause the temperature to increase above the setpoints again.

After it transmits the drive signals to the fan and/or cooling valve controller, the process is restarted and the computer begins to receive the return air temperature signal and supply air temperature sign again to adjust the cooling valves and fans as necessary to maintain the temperature and condition of the room as desired. The process may not begin until after a predetermined period of time in certain embodiments.

The components depicted and described herein above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent The presently disclosed invention improves upon known methods and systems of controlling HVAC systems by controlling the systems to operate more efficiently, thereby saving energy. One manner in which the method and system saves energy is through the prevention of load hopping. As previously discussed, "load hopping," which is when neighboring HVAC units will alternately run at full capacity while its neighbors sit inactive, results in tremendous power consumption and inefficiency. By operating in the method described, taking into consideration not only the temperature of the supply air but also the temperature of the return air, load hopping is prevented. The system further prevents CRAC unit component failures. By taking into consideration the return air temperature (as well as the supply air temperature) and by prioritizing cooling options that are power efficient, the various HVAC units in a system efficiently operate according to the changing environmental conditions. Moreover, when a HVAC unit fails, the computer 404 of the surrounding neighboring units will automatically recognize the higher return air temperature. The computers 404 will then operate to lower the room temperature to the desired setpoint by compensating for the lost cooling capacity. The disclosed invention may reduce as much as 25 percent of current energy consumption, which may be even greater depending on exterior environmental factors. As a result, the presently disclosed invention may have dramatic positive effects by reducing fossil fuel consumption and greenhouse gas emissions. It further may save corporations millions of dollars in annual power costs.

The invention claimed is:

1. A method for configuring a heating, ventilation, and air conditioning (HVAC) system, the system including at least one HVAC unit, each unit including a control circuit, the method comprising:
   receiving a return air temperature signal at the control circuit of the at least one HVAC unit;
   receiving a supply air temperature signal at the control circuit of the at least one HVAC unit;
   generating a first cooling valve drive signal based on a comparing of the return temperature signal and a return setpoint temperature;
   generating a second cooling valve drive signal based on a comparing of the supply temperature signal and a supply setpoint temperature;
   controlling a fan and a cooling valve of the at least one HVAC unit based at least on the received return air temperature signal, the received supply air temperature signal, a return setpoint temperature, and a supply setpoint temperature, wherein controlling comprises controlling the cooling valve to increase the cooling valve's water output based on comparing the first cooling valve drive signal and the second cooling valve drive signal.

2. The method of claim 1, further comprising:
   generating a cooling valve drive signal according to at least one of return air temperature signal and supply air temperature signal.

3. The method of claim 1, wherein the comparing of the first cooling valve drive signal and the second cooling valve drive signal comprises the step of comparing temperature differentials of the first cooling drive signal and temperature differentials of the second cooling drive signal.

4. The method of claim 1, wherein the controlling step further comprises:
   controlling the fan to operate at a minimum speed based on a capacity of the cooling valve.

5. The method of claim 1, wherein the controlling step further comprises:
   controlling a fan to operate above a minimum speed based on the cooling valve operating at a maximum capacity.

6. The method of claim 1, wherein the controlling step further comprises controlling the cooling valve to operate at a minimum capacity based on comparing the return air temperature signal with a cooling valve setpoint temperature.

7. The method of claim 1, wherein the HVAC system is configured to control the temperature of one or more computer systems.

8. The method of claim 1, wherein the HVAC system is configured to be used in a commercial area.

9. A heating, ventilation, and air conditioning (HVAC) system, the system comprising:
   at least one HVAC unit, each HVAC unit including:
      at least one fan;
      at least one cooling valve;
      a processor, said processor coupled to the least one fan and the at least one cooling valve, said processor, said processor is adapted to execute instructions to perform the following:
         receiving a return air temperature signal at the control circuit of the at least one HVAC unit;
         receiving a supply air temperature signal at the control circuit of the at least one HVAC unit;
         generating a first cooling valve drive signal based on a comparing of the return temperature signal and a return setpoint temperature;
         generating a second cooling valve drive signal based on a comparing of the supply temperature signal and a supply setpoint temperature;
         controlling the at least one fan and the at least one cooling valve of the at least one HVAC unit based at least on the received return air temperature signal, the received supply air temperature signal, a return setpoint temperature, and a supply setpoint temperature, wherein controlling comprises controlling the at least one cooling valve to increase the at least one cooling valve's water output based on comparing the first cooling valve drive signal and the second cooling valve drive signal.

10. The system of claim 9, said processor is further adapted to execute instructions to perform the following:
    generating a cooling valve drive signal according to at least one of return air temperature signal and supply air temperature signal.

11. The system of claim 9, wherein the comparing of the first cooling valve drive signal and the second cooling valve drive signal comprises the step of comparing temperature differentials of the first cooling drive signal and temperature differentials of the second cooling drive signal.

12. The system of claim 9, wherein the processor's controlling of the at least one fan and the at least one cooling valve further comprises:
    controlling the fan to operate at a minimum speed based on a capacity of the cooling valve.

13. The system of claim 9, wherein the processor's controlling of the at least one fan and the at least one cooling valve further comprises controlling a fan to operate above a minimum speed based on the cooling valve operating at a maximum capacity.

14. The system of claim 9, wherein the processor's controlling of the at least one fan and the at least one cooling valve further comprises controlling the cooling valve to operate at a minimum capacity based on comparing the return air temperature signal with a cooling valve setpoint temperature.

15. The system of claim 9, wherein the HVAC system is configured to control the temperature of one or more computer systems.

16. The system of claim 9, wherein the HVAC system is configured to be used in a commercial area.

* * * * *